(12) United States Patent
Wakayama et al.

(10) Patent No.: US 6,901,670 B2
(45) Date of Patent: Jun. 7, 2005

(54) SCRIBING HEAD, AND SCRIBING APPARATUS AND SCRIBING METHOD USING THE SCRIBING HEAD

(75) Inventors: Haruo Wakayama, Osaka (JP); Toshiyuki Sakai, Osaka (JP); Keiko Hayashi, Osaka (JP); Yoshitaka Nishio, Osaka (JP); Junichi Matsumoto, Osaka (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 0 days.

(21) Appl. No.: 10/483,716

(22) PCT Filed: Jul. 18, 2002

(86) PCT No.: PCT/JP02/07320
§ 371 (c)(1),
(2), (4) Date: Jan. 14, 2004

(87) PCT Pub. No.: WO03/011777
PCT Pub. Date: Feb. 13, 2003

(65) Prior Publication Data
US 2004/0154456 A1 Aug. 12, 2004

(30) Foreign Application Priority Data
Jul. 18, 2001 (JP) .......................... 2001-218146

(51) Int. Cl.⁷ .......................... C03B 33/02; B43L 13/00
(52) U.S. Cl. ........................................................ 33/18.1
(58) Field of Search ................................ 33/18.1–45

(56) References Cited

U.S. PATENT DOCUMENTS

| | | | | | |
|---|---|---|---|---|---|
| 3,753,384 A | * | 8/1973 | Anfindsen | ................... | 33/18.1 |
| 4,183,274 A | * | 1/1980 | Kingsley | .................... | 33/32.1 |
| 4,324,047 A | * | 4/1982 | Roch | ........................... | 33/18.1 |
| 4,502,225 A | * | 3/1985 | Lin | ............................. | 33/18.1 |
| 4,591,304 A | * | 5/1986 | Samis | ........................ | 33/24.2 |
| 6,460,257 B1 | * | 10/2002 | Shimotoyodome | .......... | 33/18.1 |

FOREIGN PATENT DOCUMENTS

| | | |
|---|---|---|
| JP | 10-158022 A1 | 6/1998 |
| JP | 2000-247667 A1 | 9/2000 |
| JP | 2001-1019452 A1 | 1/2001 |
| JP | 2001-206727 A1 | 7/2001 |
| JP | 2001-328833 A1 | 11/2001 |

OTHER PUBLICATIONS

International Search Report for PCT/JP02/07320 mailed on Dec. 3, 2002.

International Preliminary Examination Report for PCT/JP02/07320 completed on Nov. 10, 2003.

* cited by examiner

Primary Examiner—Christopher W. Fulton
(74) Attorney, Agent, or Firm—Rader, Fishman & Grauer PLLC

(57) ABSTRACT

A scribing head 1 of this invention raises and lowers a scribing cutter by rotation of a servomotor 3. As a scribe pressure, a rotational torque of the servomotor 3 is transmitted to the scribing cutter. To form a scribe line across another scribe line which is formed earlier, the scribe pressure is raised temporarily when the scribing head passes the scribe line which is formed earlier. The rotational torque of the servomotor 3 is controlled at any of preset limits while the position of a cutter 6 of the scribing head shifts on the brittle substrate. The servomotor 3 is driven under position-control mode.

21 Claims, 15 Drawing Sheets

Running direction

Running direction

Running direction

SCRIBING HEAD, AND SCRIBING APPARATUS AND SCRIBING METHOD USING THE SCRIBING HEAD

TECHNICAL FIELD

This invention relates to a scribing head for forming a scribe line on a brittle substrate such as plate glass, semiconductor wafer, ceramic, etc., and also relates to a scribing apparatus and a scribing method using the scribing head.

BACKGROUND ART

FIG. 16 shows a structure of a conventional scribing head 50, and FIG. 17 is a side view thereof. A tip holder 52 permits rotation of a cutter wheel tip 51. This tip holder 52 can swing freely via a vertical shaft bearing 55 which is accommodated in a holder carrier 54. Accordingly, when the scribing head 50 moves (to the right in FIG. 16), the tip holder 52 swings to align with the direction of this movement.

A scribing unit 56 is disposed above the holder carrier 54, with a small gap G. On the right side of the holder carrier 54, a bearing 57 is embedded at a predetermined position, orthogonally to the drawing sheet. A center shaft 57a of the bearing 57 is integrated with the scribing unit 56. On the left side, the bottom end of the holder carrier 54 is checked by a stopper 53. Accordingly, the holder carrier 54 pivots about the bearing 57, within a range permitted by the gap G.

The scribing unit 56 contains an air cylinder chamber 58 which extends vertically and in which a piston 59 is inserted. The bottom end of the piston 59 has a recess for keeping a bearing 60 in a loose-fit manner. Its center shaft 60a is held by the piston 59. Accordingly, the peripheral body of the bearing 60 rotates freely, with its bottom end touching the top part of the holder carrier 54. When air is fed to this air cylinder chamber 58 at a prearranged pressure, the piston 59 and the bearing 60 are pressed down to apply a predetermined scribe pressure (scribe load) to the cutter wheel tip 51. Even when the holder carrier 54 is tilted, the bearing 60 transmits the pressure from the piston 59 straight down to the holder carrier 54 without fail.

Turning to FIG. 17, the scribing head 50 is disposed movably along a horizontal guide rail 67 of the scribing apparatus 66. The scribing head 50 can also move upwardly and downwardly when driven by an up-down cylinder or motor 65. Descent of the scribing head 50 causes the cutter wheel tip 51 to abut on a glass plate W. After that, the holder carrier 54 pivots about the bearing 57, creating a clearance between the holder carrier 54 and the stopper 53. On detection of this clearance, descent of the scribing head 50 stops. Then, the scribing head 50 descends again by a predetermined cut-in depth. Thereafter, a predetermined scribe pressure is set to the air cylinder chamber 58.

FIG. 18 shows a plate glass scribing apparatus 20 which is disclosed in Japanese Patent Laid-open Publication No. H8-225333. This apparatus has a detection unit 24 which employs a piezoelectric device for detecting up-down movement of a glass cutter 38 and a desired scribe pressure. A detection signal from the piezoelectric device is processed through an amplification unit 39 and a process unit 26, and a control unit 28 controls a linear motor 22.

Having said that, the scribing head 50 of FIG. 16 requires complex mechanisms such as a motor for lowering the cutter wheel tip 51 to a certain level, and an electric-pneumatic converter for setting a desired scribe pressure. Likewise, the apparatus of FIG. 18 needs the detection unit 24 and a circuit for processing a detection signal from this unit, thus complicating the scribing head mechanism. Further, because the movable members have large inertia, the apparatus shows poor responsivity and has difficulty in stabilizing the scribing quality.

Incidentally, to produce square glass chips which are used as an electric parts material, a base material of a large glass plate is scribed and broken into square glass pieces in the following manner. In the beginning, a cutter wheel tip is made to run in one direction on a surface of the base material. To form parallel scribe lines, this operation is repeated for predetermined times, with the start position displaced after each run. Next, to form scribe lines which intersect mutually, the running direction of the cutter wheel tip is changed so as to cross the previous running direction. After this cross-scribing operation, the base material is transferred to a breaking machine. The breaking machine imposes a certain pressure on the base material and applies a bending moment along the scribe lines formed on the base material. Eventually, the base material is broken along the scribe lines to give intended square glass chips.

As known, this scribing operation can be performed, for example, with an apparatus illustrated in FIG. 19. In the following description, the lateral directions in this drawing are taken as X directions and the directions orthogonal to the drawing sheet are taken as Y directions.

This scribing apparatus comprises: a worktable 70 which can rotate horizontally and on which a glass plate GL is laid and fixed by a vacuum suction means; a pair of guide rails 71, 71 which support the worktable 70 movably in Y directions; a ball screw 72 which displaces the worktable 70 along the guide rails 71, 71; a guide bar 73 which is constructed above the worktable 70 along X directions; a scribing head 76 which is attached to the guide bar 73 and slidable in X directions; a motor 74 for sliding the scribing head 76; a tip holder 77 which is swingably attached at the bottom of the scribing head 76 and which is movable upwardly and downwardly; a cutter wheel tip 78 which is rotatably mounted at the bottom end of the tip holder 77; and a pair of CCD cameras 75 which locate above the guide bar 73 in order to recognize alignment marks on the glass plate GL laid on the worktable 70.

While the scribing head is running, various factors, such as inevitable microscopic unevenness on the surface of the glass plate GL, may cause distortion of a scribe line. Hence, an anti-distortion measure is incorporated into the scribing head of the scribing apparatus of this structure. As specifically shown in FIG. 20, the tip holder 77 is mounted to the scribing head body 76A via a turning shaft 79 which extends orthogonally to the surface of the glass plate GL, such that the tip holder 77 can swing freely around the axis of the turning shaft 79. In addition, the cutter wheel tip 78 is attached to the tip holder 77 at the position $Q_2$ which is offset from the axis $Q_1$ of the turning shaft 79 toward the opposite direction to the running direction (direction of Arrow S in the drawing). As a result, while the scribing head is running, the cutter wheel tip 78 follows the scribing head body 76A. Hence, the cutter wheel tip 78 gains stability in straight movement, which serves to prevent distortion of a scribe line.

This scribing apparatus operates without problem as far as scribe lines are formed on a glass plate only in one direction. On the other hand, referring to FIG. 21, a cross-scribing operation tends to fail near the points where the cutter wheel tip 78 crosses and passes the former scribe lines $L_1$–$L_3$, because the apparatus does not make the latter scribe lines $L_4$–$L_6$ at those points, or it "skips" the intersections. If intersections are skipped on a scribed glass plate, the glass plate is not broken precisely along the scribe lines in the breaking operation using the above-mentioned breaking machine. Eventually, the scribing apparatus yields a volume of defective products and shows an extremely poor productivity.

The reason for this problem is understood as follows: a scribing force which is applied from the scribing head to the glass plate surface is cancelled when the cutter wheel tip crosses and passes existing scribe lines, by latent internal stresses on both sides of these scribe lines.

As a solution to this problem, the applicant proposed a scribing method, a scribing head and a scribing apparatus (Japanese Patent Application No. 2000-142969). The scribing head comprises: a scribing head body which runs on a brittle substrate; a tip holder mounted on the scribing head body via a turning shaft which extends orthogonally to a surface of the brittle substrate, the tip holder being freely swingable around the axis of the turning shaft; a cutter wheel tip attached to the tip holder at a position which is offset from the axis of the turning shaft toward the opposite direction to the running direction. This scribing head is used to provide scribe lines which cross each other on the surface of the brittle substrate. During the scribing operation, the swing range of the tip holder is controlled at greater than 0° but not greater than 2°. FIG. 22 shows a front view of an embodiment of this scribing head, and FIG. 23 is its bottom view.

The scribing head has a scribing head body 80, a bearing housing 81, a tip holder 82, a cutter wheel tip 83, and a bias means 84.

The bottom of the scribing head body 80 is cut away to form a notch 85 which accommodates the bearing housing 81. An end of the bearing housing 81 is joined, via a bearing 87, with a horizontal support shaft 86 which is inserted in the scribing head body 80. The other end abuts on a stopper shaft 88 which is contained within the scribing head body 80 and which extends parallel to the support shaft 86. Hence, the bearing housing 81 pivots around the axis of the support shaft 86 until it is stopped by the stopper shaft 88.

The tip holder 82 is mounted to the bearing housing 81 via a turning shaft 89 which extends orthogonally to the surface of the brittle substrate, the tip holder being freely swingable around the axis of the turning shaft 89. A bearing 40 is set between the turning shaft 89 and the bearing housing 81. The bias means 84 which locates above the turning shaft 89 is arranged to apply a biasing force to the cutter wheel tip 83, through the turning shaft 89 and the tip holder 82.

The cutter wheel tip 83, attached to the tip holder 82, is offset from the axis of the turning shaft 89 toward the opposite direction to the running direction S of the scribing head (offset to the left in FIG. 22).

During the scribing operation, the swing range A of the tip holder 82 is controlled at greater than 0° but not greater than 2°, by means of a groove 41 which is formed in the bottom surface of the bearing housing 81. Namely, the tip holder 82 has its upper end accommodated in the groove 41 of the bearing housing 81. When the tip holder 82 swings to the maximum limit of its swing range, either pair of opposing corners 42, 45 (43, 44) at its upper end are arranged to abut on interior walls 46, 47 of the groove 41. Owing to this arrangement, the swing range A of the tip holder 82 can be adjusted in the defined range, by adjustment of clearances between the interior surfaces 46, 47 of the groove 41 and the side faces 48, 49 at the upper end of the tip holder 82. It is readily understood that the clearances are set greater in order to expand the swing range A, whereas the clearances are set smaller for a narrower swing range.

These arrangements ensure the operation of the scribing head proposed by the applicant, by securing the swing action of the tip holder to such a degree as to keep straight movement of the cutter wheel tip, and also by suppressing the influence of latent internal stresses near the intersections. Consequently, even if a pressure is applied by the scribing head at a fixed level, the cross-scribing operation does not experience skipping of intersections nor missing of a scribe line at the starting end of scribing. Thus, the applicant's scribing head achieves the desired objects.

In this scribing head, the cutter wheel tip, attached to the tip holder, is offset from the axis of the turning shaft toward the opposite direction to the running direction. During the scribing operation, the scribing head runs with the support shaft side ahead. Hence, the cutter wheel tip is caused to jump up when the scribing head crosses existing scribe lines, or passes an undulated or warped part of a glass or an uneven part on a glass surface. In this connection, the tip holder tends to pivot about the support shaft and to bounce over the glass surface. The schematic view of FIG. 13 illustratively explains this phenomenon, wherein the sign GL designates glass, 83 indicates the cutter wheel tip, and 86 indicates the support shaft.

Namely, when the scribing head runs (in the direction of Arrow S in the drawing) with the support shaft 86 ahead and with the cutter wheel tip 83 being pressed against a surfact of the glass GL by the bias means 84, the point of contact between a blade ridge 83A of the cutter wheel tip 83 and the surface of the glass GL is given as the point P. At this point P, a reaction force R is generated toward the center of the cutter wheel tip 83, against a resultant force of a horizontal scribing force component M and a vertical scribing force component N, wherein the scribing force components M and N represent a horizontal component and a vertical component, respectively, of a scribing force which is required to scribe the glass GL by the cutter wheel tip 83. The reaction force R acts on the cutter wheel tip 83, as a turning moment around the support shaft 86. Consequently, the cutter wheel tip 83 is caused to jump up. In this connection, the tip holder (not shown) tends to pivot about the support shaft 86 and to bounce over the glass surface GL.

If the tip holder bounces in this manner, the pressure to the cutter wheel tip 83 is cancelled by the reaction force R. In this situation, formation of a deep vertical crack is less likely.

Incidentally, let us describe a mechanism of how the cutter wheel tip creates a vertical crack on the glass. For a start, a load imposed on the blade edge causes elastic deformation on the glass surface, at a part where the blade edge touches the glass surface. With an increase of the load on the blade edge, this part undergoes plastic deformation. When the blade edge load becomes so great as to exceed the critical limit of plastic deformation, brittle fracture occurs, and a vertical crack begins to grow in the glass thickness direction. Growth of the vertical crack terminates once the leading end of the crack reaches a certain depth (a distance from the surface of the brittle substrate) which depends on the amount of blade edge load, glass composition, glass thickness, etc. In this case, provided that the composition and the thickness of the glass are the same, the depth of the leading end of the vertical crack (hereinafter mentioned as "vertical crack propagation depth") is controllable only by the load on the blade edge. In other words, with an increase of the blade edge load, the blade edge of the cutter wheel tip cuts deeper into the glass surface and gives a greater energy to generate a vertical crack, so that the vertical crack propagation depth becomes longer. However, once the blade edge load exceeds a certain level, a comparatively deep vertical crack is obtained, but at the same time, internal distortion which has accumulated near the glass surface reaches saturation. Such an excessive blade edge load results in growth of a so-called horizontal crack in a direction totally different from the growing direction of the vertical crack. The horizontal crack causes generation of a large amount of undesirable chips.

The inventors investigated the above-mentioned mechanism in more detail and discovered a relationship between the blade edge load and the vertical crack propagation depth, as given in FIG. 14. As seen in the graph of FIG. 14, the vertical crack propagation depth is related with three stages: an initial stage (Stage A) where the depth gently increases with increment of the blade edge load; an intermediate stage (Stage B) where the depth sharply increases with increment of the blade edge load; and a final stage (Stage C) where the depth hardly increases despite increment of the blade edge load. While a horizontal crack is not observed in Stage A and Stage B, Stage C showed drastic increase of horizontal cracks.

Based on this knowledge, the inventors discovered that a deep vertical crack is obtainable without generation of a horizontal crack, when a scribing operation is performed with a blade edge load in Stage B, where the propagation depth increases sharply with increment of the blade edge load.

Nevertheless, due to the extreme narrowness of the range of the blade edge load in Stage B, it turned out to be difficult to achieve a stable scribing operation in Stage B alone as far as adjustment of the blade edge load is done as in a usual scribing operation. In particular, as discussed above, prior art cannot prevent a bounce of the tip holder, permitting the pressure to the cutter wheel tip to be cancelled by the reaction force R. Under such circumstances, it is awfully difficult to adjust the blade edge load within the extremely narrow Stage B.

Also as mentioned earlier, the cross-scribing operation involves a task of preventing skipping of intersections. For this purpose, the blade edge load for formation of second scribe lines should be much greater than the load for formation of first scribe lines. In this case, the blade edge load often falls into Stage C, inevitably causing increase of horizontal cracks and associated generation of a large volume of chips.

In addition to the problems mentioned above, a scribing operation using a conventional cutter wheel is also affected by some external factors such as an undulated or warped glass, an uneven glass surface, and wearing of the tip holder which holds the cutter wheel tip or of the scribing head which carries the tip holder. In this case, formation of stable scribe lines is often hampered.

This invention is made to solve these problems. A first object of the invention is to provide a scribing head, and a scribing apparatus and a scribing method using this scribing head, in which the scribing head has a simple mechanism and is suitably adaptable to various scribe conditions. A second object of the invention is to provide a scribing head, and a scribing apparatus and a scribing method using this scribing head, in which the scribing head prevents not only skipping of intersections during a cross-scribing operation but also a bounce of the tip holder. As a consequence, a pressure imposed on the cutter wheel tip is efficiently applied to a brittle substrate, realizing a vertical crack which is much deeper than the one obtained in a conventional manner.

DISCLOSURE OF THE INVENTION

In order to achieve the above-mentioned objects, a scribing head of the invention is equipped with a scribing cutter for forming a scribe line on a brittle substrate, the scribing cutter being raised and lowered by rotation of a servomotor, and as a scribe pressure, a rotational torque of the servomotor is transmitted to the scribing cutter.

Use of a servomotor simplifies the scribing head mechanism and realizes a scribing head and a scribing apparatus which are available at a lower price. Besides, the zero position can be detected on software, without relying on a conventional contact mechanism. Further, owing to good responsivity of the scribe pressure generation mechanism, various scribe conditions can be flexibly adopted.

In this arrangement, rotational movement of the servomotor may be converted to vertical movement through a gear, and the rotational torque may be applied as a scribe pressure.

To form a scribe line across another scribe line which is formed earlier, the scribe pressure may be raised temporarily when the scribing head passes the scribe line which is formed earlier. Preferably, the rotational torque of the servomotor is controlled at any of preset limits while the position of the cutter of the scribing head shifts on the brittle substrate. Also preferably, the servomotor is driven under position-control mode. If this is the case, it is preferable that the servomotor sets a position of the scribing head so as to locate below a top surface of the brittle substrate, and substantially at the same time as the start of a scribing action, the thus set position is lowered further.

This arrangement can prevent the cutter wheel tip from jumping up when it crosses a raised scribe trace formed in a previous scribing action. This is an effective measure against "skipping of intersections".

Another scribing head of the invention comprises: a scribing head body which runs on a brittle substrate; a tip holder mounted on the scribing head body via a support shaft which extends parallel to a surface of the brittle substrate, the tip holder being freely swingable around the axis of the support shaft; and a cutter wheel tip attached to the tip holder via a rotation shaft which extends parallel to the surface of the brittle substrate, the cutter wheel tip being freely rotatable around the axis of the rotation shaft.

This second scribing head may incorporate the arrangements for the scribing head mentioned earlier.

Concerning any scribing head of the invention, it is preferable that the tip holder is mounted via a turning shaft which extends orthogonally to the surface of the brittle substrate, the tip holder being freely swingable around the axis of the turning shaft.

The rotation shaft may be offset from the axis of the turning shaft toward the support shaft.

The axis of the support shaft may locate on or above a vector line of a reaction force which derives from the brittle substrate and which is exerted on the cutter wheel tip during the scribing action.

A scribing apparatus of the invention is for scribing a brittle substrate by moving a scribing head which is equipped with a scribing cutter for forming a scribe line on a brittle substrate. This scribing apparatus is equipped with any of the scribe heads mentioned above.

A method of the present invention for scribing a brittle substrate uses a scribing head which comprises: a scribing head body which runs on a brittle substrate; a tip holder mounted on the scribing head body via a support shaft which extends parallel to a surface of the brittle substrate, the tip holder being freely swingable around the axis of the support shaft; and a cutter wheel tip attached to the tip holder via a rotation shaft which extends parallel to the surface of the brittle substrate, the cutter wheel tip being freely rotatable around the axis of the rotation shaft. The scribing head forms a scribe line on the surface of the brittle substrate by running on the brittle substrate, with the support shaft being behind the cutter wheel tip.

In this arrangement, it is preferable that the tip holder is mounted via a turning shaft which extends orthogonally to the surface of the brittle substrate, the tip holder being freely swingable around the axis of the turning shaft.

The rotation shaft may be offset from the axis of the turning shaft toward the support shaft.

The scribing method of the invention may be performed while maintaining a state where a reaction force which derives from the brittle substrate and which is exerted on the cutter wheel tip during the scribing action, is oriented along a line which connects the origin of the reaction force and the axis of the support shaft, or oriented nearer to the brittle substrate relative to the line.

Owing to these features, the scribing head of claims 7–11 and the scribing method of claims 12–15 acquire a following effect. While the scribing head runs (in the direction of Arrow T in FIG. 13) with the support shaft 99 behind and with the cutter wheel tip 95 being pressed against a surface of the glass GL by the bias means 96, the point of contact between a blade ridge 95A of the cutter wheel tip 95 and the surface of the glass GL is given as the point E in FIG. 13. At this point E, a reaction force X is generated against a resultant force of a horizontal scribing force component V and a vertical scribing force component W, wherein the scribing force components V and W represent a horizontal component and a vertical component, respectively, of a scribing force which is required to scribe the glass GL by the utter wheel tip 95. The reaction force X, which is directed to the support shaft 99, does not act as a turning moment which causes the cutter wheel tip 95 to jump up from the glass GL. In this situation, the tip holder does not bounce in the manner mentioned above, and the pressure to the cutter wheel tip 95 is not cancelled by the reaction force X. As a consequence, the pressure applied to the cutter wheel tip 95 acts efficiently on the glass (brittle substrate), realizing a vertical crack which is much deeper than the one obtained conventionally.

In this connection, the tip holder may be mounted via a turning shaft which extends orthogonally to the surface of the brittle substrate, and may be freely swingable around the axis of the turning shaft. This arrangement can enhance the follow-up ability of the tip holder in the scribe head running direction.

Further, the rotation shaft may be offset from the axis of the turning shaft toward the support shaft. This arrangement can also enhance the follow-up ability of the tip holder in the scribe head running direction.

The scribing method and the scribing head as above are preferred to maintain a state where a reaction force which derives from the brittle substrate and which is exerted on the cutter wheel tip during the scribing action, is oriented along a line which connects the origin of the reaction force and the axis of the support shaft, or oriented nearer to the brittle substrate relative to the line. This arrangement can eliminate, with a greater reliability, generation of a turning moment which causes the tip holder to bounce as explained earlier.

BEST MODE FOR CARRYING OUT THE INVENTION

Figure 1:
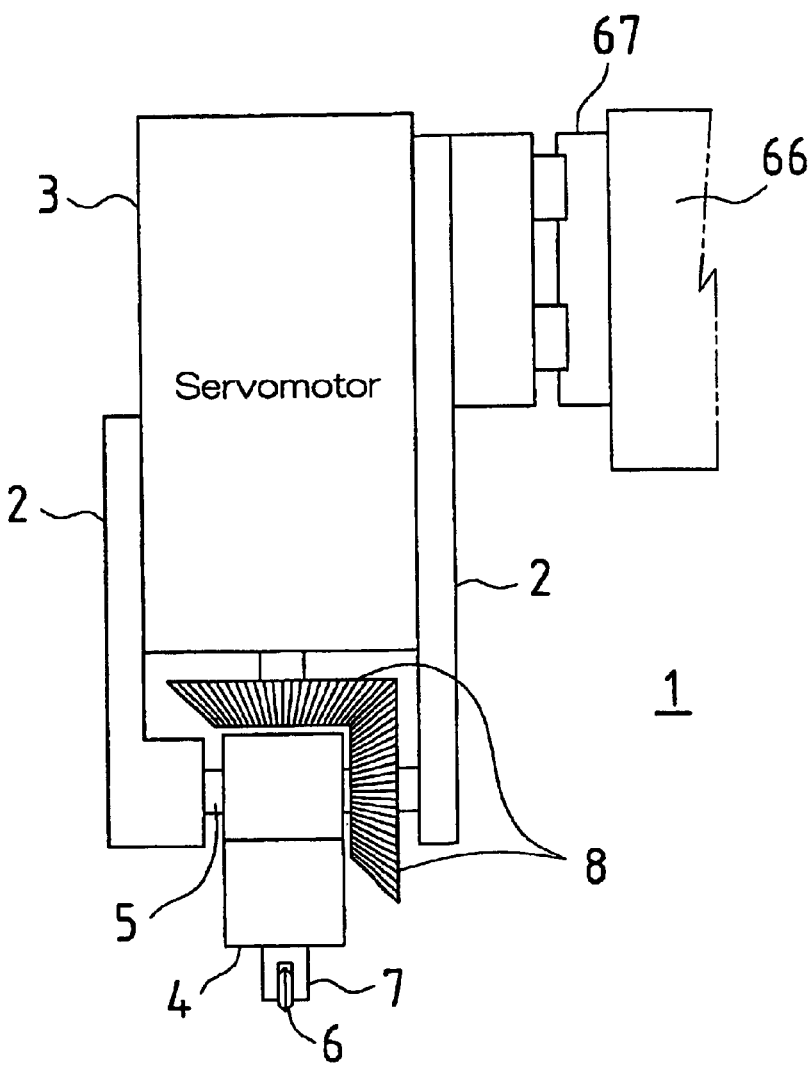
FIG. 1 is a side view of a scribing head according to Embodiment 1 of the invention.

Referring to the drawings, embodiments of the invention are described below.

<Embodiment 1>

Figure 2:
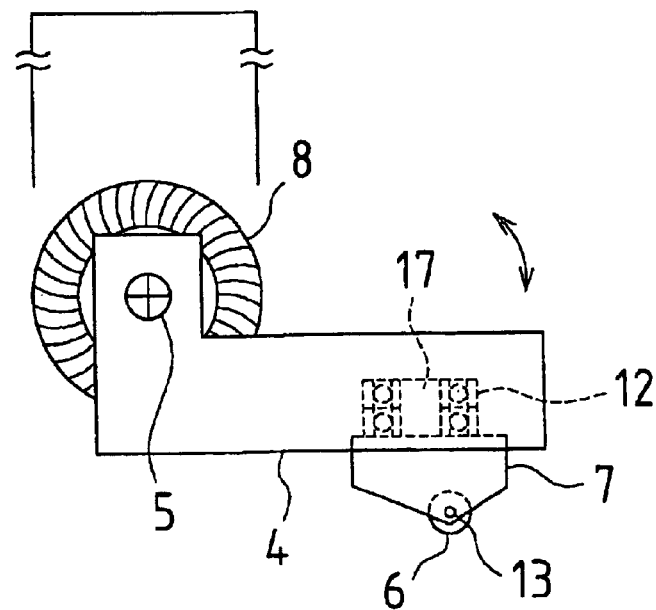
FIG. 2 is a front view of its principal part.

FIG. 1 is a side view of a scribing head 1, as the first embodiment of the invention. FIG. 2 is a front view of its principal part.

In the scribing head 1, a servomotor 3 is held inverted between a pair of side walls 2. A holder carrier 4 with an L-shape profile is attached to the lower parts of the side walls 2 via a support shaft 5, and is capable of turning freely. A tip holder 7 for rotatably holding a cutter wheel tip 6 is mounted at the front part (in the right in FIG. 2) of the holder carrier 4.

The tip holder 7 is mounted to the holder carrier 4, via a turning shaft 17 provided at its top end and a bearing 12 in which the turning shaft 17 extends. The tip holder 7 can turn about the axis of the turning shaft 17.

The cutter wheel tip 6 is attached to the tip holder 7 via a rotation shaft 13 which extends parallel to the surface of the brittle substrate, and the cutter wheel tip can rotate freely around the axis of the rotation shaft 13. Besides, the rotation shaft 13 is offset from the axis of the turning shaft 17 of the tip holder 7 toward the opposite side to the support shaft 5.

The rotation shaft of the servomotor 3 and the support shaft 5 are equipped with bevel gears 8 which are in mesh with each other. In response to forward and reverse rotation of the servomotor 3, the holder carrier 4 pivots up and down about the support shaft 5, thereby raising and lowering the cutter wheel tip 6. Incidentally, the scribing head 1 as a whole is movable along the horizontal guide rail 67 of the scribing apparatus 66. It should be noted that the power transmission mechanism is not limited to bevel gears 8.

Figure 3:
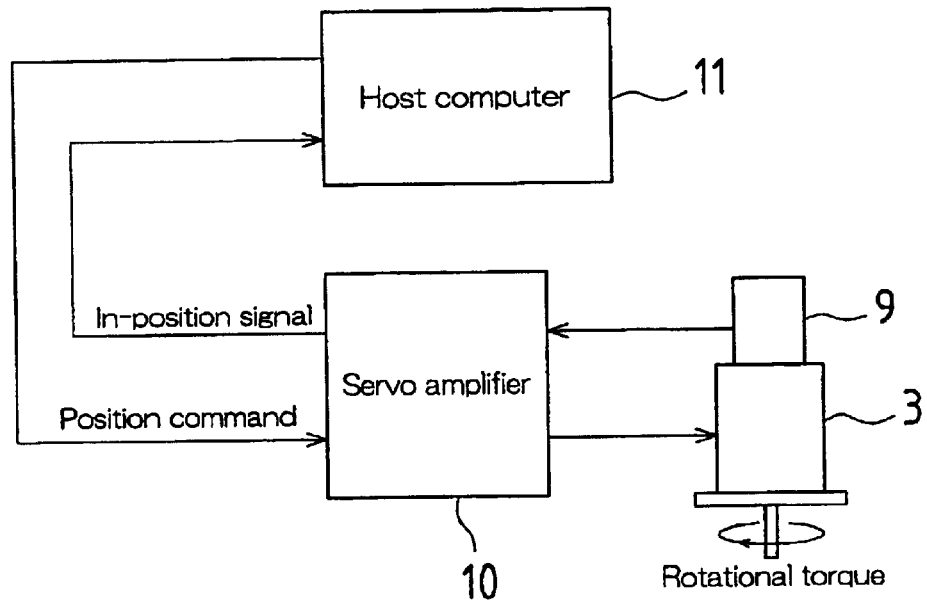
FIG. 3 illustrates a control system for the scribing head according to the invention.

FIG. 3 illustrates a control system for the scribing head 1 of FIG. 1.

An encoder 9 detects the rotation state of the servomotor 3. A servo amplifier 10 controls the servomotor 3, and sends a predetermined drive signal to the servomotor 3, based on a feedback signal from the encoder 9. A host controller 11 controls the action of the scribing head, and provides the servo amplifier 10 with a position command signal.

Now, the operation in the control system of FIG. 3 is described with reference to FIG. 4 which illustrates actions of the cutter wheel tip during a scribing operation.

Figure 4:
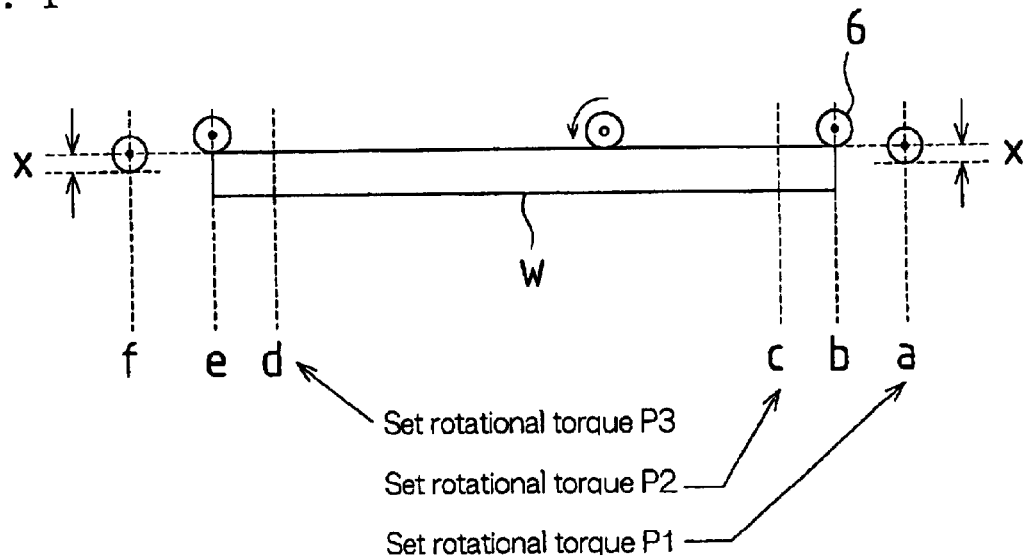
FIG. 4 illustrates movement of the cutter wheel tip during a scribing operation, the cutter wheel tip being attached to the scribing head according to Embodiment 1.

With the movement of the scribing head 1 along the guide rail 67 of the scribing apparatus 66, the cutter wheel tip 6 of the scribing head 1 moves to the start point a in FIG. 4. Then, in response to a command to descend to a cut-in position which is lower by x than the zero position (the top surface of the glass plate W), the cutter wheel tip 6 shifts to the designated height and stays at that position.

Further, in order to set a scribe pressure P1 which is applied when the cutter wheel tip 6 rides on the glass plate W, the rotational torque (torque limit) of the motor 3 is changed to a ride-on torque limit P1. The rotational torque P1 should be determined at a value that does not cause damage to an edge of the substrate when the blade edge rides on the glass plate W.

Next, the scribing head 1 moves parallel at a preset speed for riding onto the glass plate W. After the cutter wheel tip 6 rides on the glass plate W at the point b, the cutter wheel tip 6 advances from the point b by a preset distance (from b to c). At the point c, the host controller 11 gives a command to change the rotational torque (torque limit) to a press-in torque limit P2, whereby a scribe pressure suitable for the composition of the glass plate W and other factors is transmitted to the cutter wheel tip 6.

After the rotational torque P2 (>P1) and the desirable scribe pressure to the cutter wheel tip 6 are set, the scribing head 1 moves at a preset scribe speed. The relationship between the rotational torque and the scribe pressure is worked out in advance and compiled in a conversion table.

When the cutter wheel tip 6 reaches the point d, the scribing head 1 slows down from the scribe speed to a preset speed for coming out of the glass plate W. In addition, the rotational torque (torque limit) is changed to a come-out torque limit P3 (<P2) which is low enough to avoid damage to the edge of the glass, just as mentioned for the ride-on action. In this state, the cutter wheel tip 6 advances to the point e, where it comes out of the glass plate W. At this moment, the rotational torque is changed to a positioning torque, so that the height of the cutter wheel tip 6 is kept at the cut-in position again. When the cutter wheel tip 6 moves as it is and reaches the point f, a series of scribing processes is complete.

The rotational torques P1, P3 are smaller than the rotational torque P2 for the scribing action. This is a measure to avoid generation of unwanted cracks in a glass plate W, when the cutter wheel tip 6 rides onto or comes out of the glass plate W. The coordinate data at the points a–f are set in advance, according to the size of the glass plate W.

As described above, the scribing head 1 of this embodiment involves a mechanism for applying the rotational torque of the servomotor 3 directly as a scribe pressure. The resultant scribing head shows a remarkable responsivity, and hence enables a scribing operation as mentioned next.

Figure 5:
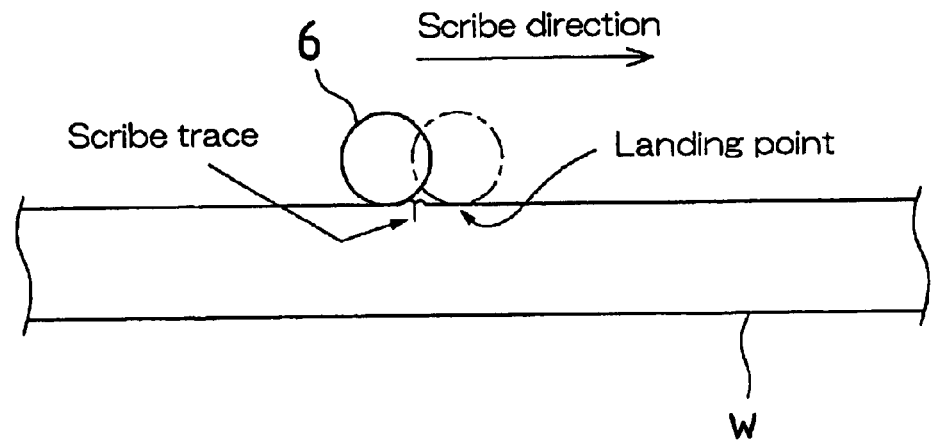
FIG. 5 is a diagram illustrating an orthogonal scribe operation across an existing scribe line.

FIG. 5 shows an orthogonal scribing operation across a glass plate W which is already scribed. In crossing a raised scribe trace, the cutter wheel tip 6 jumps up at this part and causes scribe failure by interrupting a scribe line. To prevent this problem, it is known to increase the scribe pressure temporarily while the scribe trace is crossed.

This can be realized by the scribing head 1 of this embodiment which is capable of changing the scribe pressure instantaneously. To be specific, positional data of intersections where scribe lines to be formed will cross are input in advance. While the scribing head 1 is moving, the scribe pressure is adjusted momentarily every time the scribing head passes an intersection.

When the servomotor scribing head as above is employed to scribe a brittle substrate, the position-control of the servomotor scribing head (the scribing head 1) is conducted in the manner as detailed below.

Figure 7:
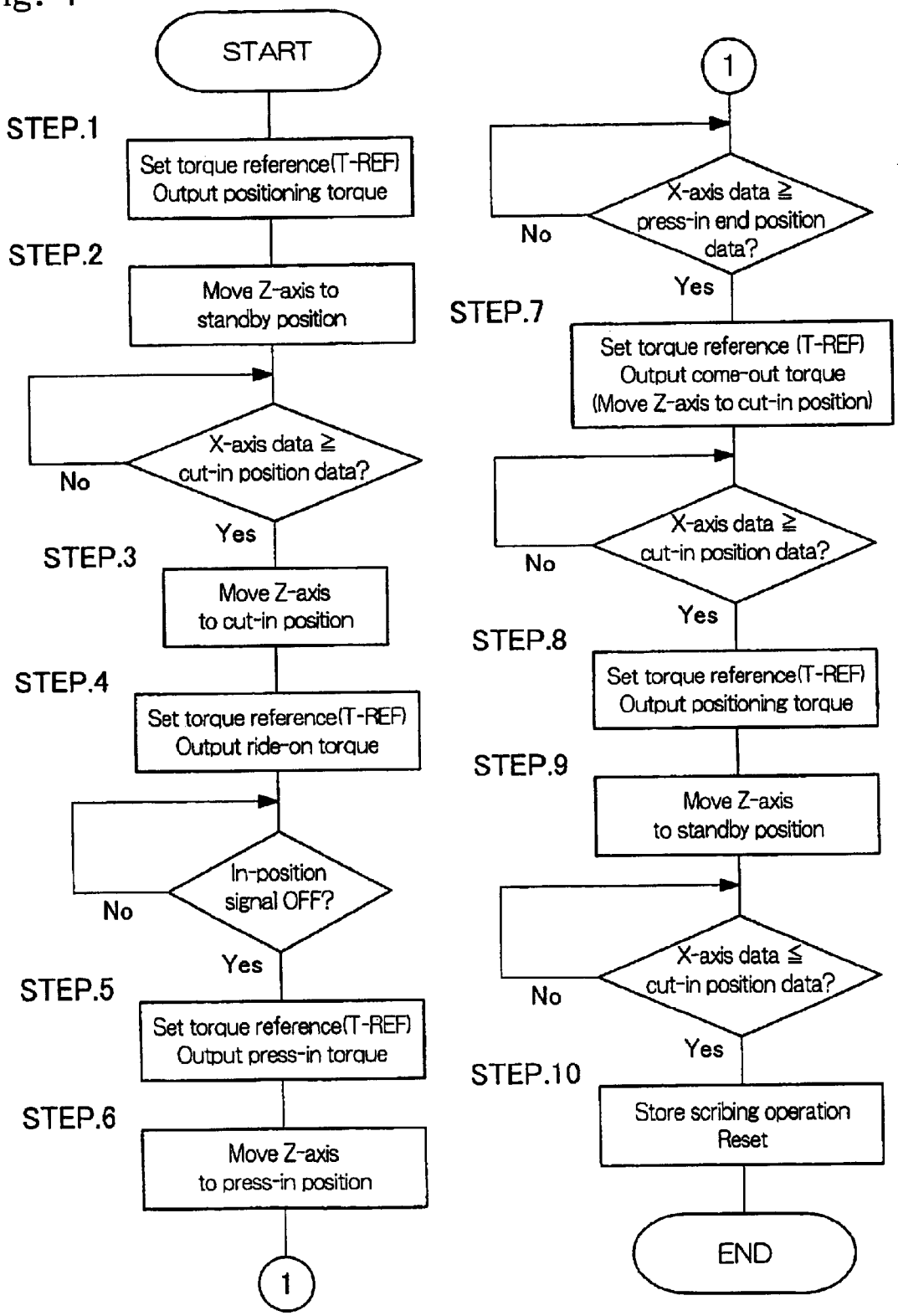
FIG. 7 is a flowchart for one scribing operation, concerning how to control the scribing head according to the invention.
Figure 8:
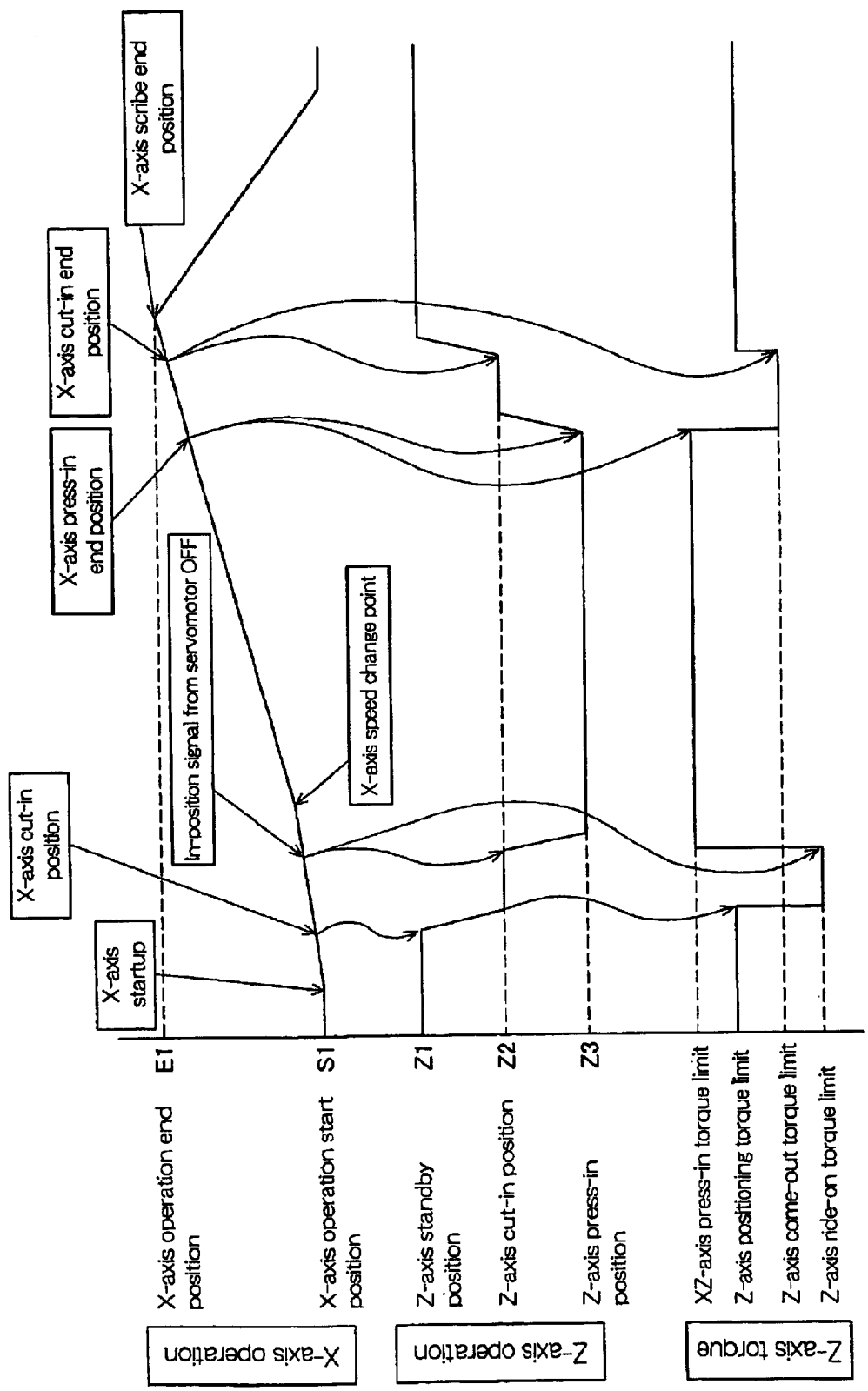
FIG. 8 is a timing chart of this control method for one scribing operation, concerning changes in X-axis operation, Z-axis operation and Z-axis torque.

FIG. 7 is a flowchart for one scribing operation, concerning how to control the servomotor scribing head (the scribing head 1). FIG. 8 is a timing chart for one scribing operation, concerning changes in X-axis operation (movement of the scribing head over the substrate), Z-axis operation (action of the cutter wheel tip which is attached to the scribing head) and Z-axis torque (rotational torque of the servomotor), along with passage of time.

These drawings concern an example wherein the cutter moves from left to right on the substrate (the positional data becomes greater in this direction of movement), and a substrate is scribed in a direction in which the positional data of the X-axis increases. A feature of this embodiment resides in the control of Z-axis torque based on X-axis positional data.

As the X-axis positional data to be set, there may be mentioned X-axis operation start position and X-axis operation end position, as well as intermediate positions therebetween: X-axis startup position, X-axis cut-in position, X-axis press-in end position, X-axis cut-in end position, and X-axis scribe end position. Between the X-axis cut-in position and the X-axis press-in end position, the In-Position signal from the servo amplifier which controls the servomotor is detected to be in the OFF state, which confirms that the cutter wheel tip has ridden on the substrate completely. The X-axis cut-in position data represents a point on the X-axis where the Z-axis (the cutter wheel tip) should shift to the cut-in position during one scribing operation. The X-axis press-in end position data represents a point on the X-axis where the Z-axis (the cutter wheel tip) should shift from the press-in position back to the cut-in position during one scribing operation. The X-axis cut-in end position data represents a point on the X-axis where the Z-axis (the cutter wheel tip) should shift from the cut-in position to the standby position during one scribing operation. As the limits to be set as Z-axis torque data, there may be mentioned Z-axis ride-on torque limit, a torque limit when the cutter wheel tip rides on a glass during a scribing operation; Z-axis come-out torque limit, a torque limit when the cutter wheel tip comes out of the glass during a scribing operation; Z-axis press-in torque limit, a torque limit after the cutter wheel tip has completely ridden on the substrate and until it finishes the press-in action; and Z-axis positioning torque limit, a torque limit when the cutter wheel tip is positioned.

In one scribing operation, the control method proceeds in the manner given in FIG. 7. The Z-axis positioning torque limit is set and output (STEP.1). Next, the cutter wheel tip is moved to the Z-axis standby position (Z1 in FIG. 8) (STEP.2). If the X-axis operation data is equal to or greater than the cut-in position data, the cutter wheel tip is brought to the Z-axis cut-in position (Z2 in FIG. 8) (STEP.3). Thereafter, the Z-axis ride-on torque limit is set and output (STEP.4).

Incidentally, the Z-axis ride-on torque limit is set for the following reason. When the cutter wheel tip rides onto a brittle substrate, the cutter wheel tip deviates from the Z-axis cut-in position. Therefore, even if the In-Position signal which is output from the servo amplifier is ON, the servomotor attempts to reposition the cutter wheel tip to the original Z-axis cut-in position. In this situation, it is necessary to limit a servomotor's repositioning torque, and thus to set a Z-axis ride-on torque limit. The Z-axis ride-on torque limit is low enough to avoid generation of chipping at an edge of the brittle substrate when the cutter wheel tip rides onto the brittle substrate. Then, if the In-Position signal which is output from the servo amplifier is OFF, the Z-axis press-in torque limit is set and output (STEP.5).

In the next step, the cutter wheel tip is brought to the Z-axis press-in position (Z3 in FIG. 8) (STEP.6). Normally, the Z-axis cut-in position is set 0.05 mm to 0.20 mm below the top surface of the brittle substrate. When the In-Position signal which is output from the servo amplifier turns OFF, it is confirmed that the cutter wheel tip has ridden onto the brittle substrate. Then, the brittle substrate is scribed at a torque which is set as the Z-axis press-in torque limit. At this stage, if the Z-axis position remains at the Z-axis cut-in position, the amount of displacement is too small to give a press-in torque suitable for the scribing action (the torque does not reach the Z-axis press-in torque limit). Therefore, the Z-axis position is set to the Z-axis press-in position which is below the top surface of the brittle substrate and lower than the Z-axis cut-in position, so that the Z-axis press-in torque limit suitable for scribing various brittle substrates can be obtained in this manner.

Next, when the X-axis movement position data is equal to or greater than the X-axis press-in end position data, the Z-axis come-out torque limit is set and output so as to bring the Z-axis position to the Z-axis cut-in position. The Z-axis come-out torque limit is low enough to avoid generation of chipping at an edge of the brittle substrate when the cutter wheel tip comes out of the brittle substrate (STEP.7). Later, when the data of the scribing head is equal to or greater than the X-axis cut-in end position data, the Z-axis positioning torque limit is set and output (STEP.8), and the cutter wheel tip is moved to the Z-axis standby position (Z1 in FIG. 8) (STEP.9). Afterwards, when the X-axis operation data becomes equal to or less than the cut-in position data, the scribing operation data is stored and then reset to the initial conditions (STEP.10), which marks the end of one scribing operation.

As described, when the position set by the position-controlled servomotor deviates, the rotational torque for recovering the position set by the servomotor is limited in order to scribe a brittle substrate. In addition, for the purpose of avoiding chipping at an edge of the brittle substrate and forming high-quality scribe lines, the Z-axis position which is set previously should be lowered further below the top surface of the brittle substrate, substantially at the same time as the start of the scribing action.

Incidentally, the flowchart of FIG. 7 is described with a proviso that the scribing head moves on the substrate in a direction in which the positional data becomes greater. On the other hand, if the scribing head moves in a direction in which the X-axis positional data is diminished, the terms "equal to or greater than" and "equal to or less than" should be understood in the opposite sense. A series of these processes can be shown in the timing chart of FIG. 8. Namely, when the scribing head starts up and locates at the X-axis cut-in position, the cutter wheel tip which has been at the standby position (Z1) moves to the Z-axis cut-in position (Z2), with the Z-axis torque at the Z-axis positioning torque limit. Until the In-Position signal from the servo amplifier turns OFF, the Z-axis position remains at the Z-axis cut-in position (Z2), and the Z-axis torque is maintained at the Z-axis ride-on torque limit. After the In-Position signal from the servo amplifier turns OFF and until the X-axis position reaches the X-axis press-in end position, the Z-axis position is at the Z-axis press-in position (Z3), and the Z-axis torque is maintained at the Z-axis press-in torque limit. Thereafter, between the X-axis press-in end position and the X-axis cut-in end position, the Z-axis position is at the Z-axis cut-in position (Z2), and the Z-axis torque is maintained at the Z-axis come-out torque limit. Beyond the X-axis scribe end position, the Z-axis position and the Z-axis torque are reset to the initial conditions.

As detailed above, the servomotor scribing head is controlled by position-control mode. Consequently, it is possible to scribe a brittle substrate by properly changing the preset rotational torque limits in association with movement of the scribing head. Besides, a control program can be quite simple.

Figure 6:
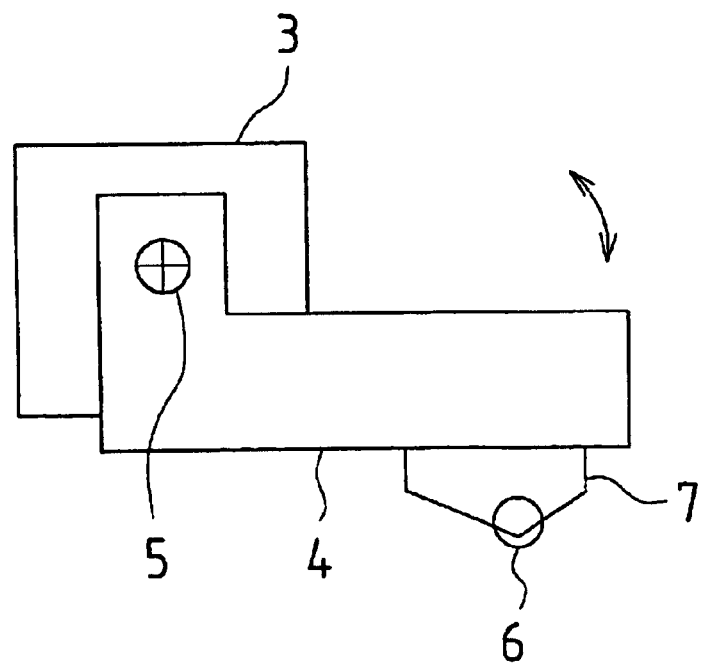
FIG. 6 depicts a scribing head according to another embodiment of the invention.

As the power transmission mechanism, this embodiment employs the bevel gears 8 in order to transmit power to the holder carrier 4 (see FIG. 1). Alternatively, as shown in FIG. 6, the rotation shaft of the servomotor 3 may be directly joined with the holder carrier 4.

As a scribing cutter for scribing a glass plate (a brittle substrate), the scribing head of this embodiment can be equipped with a cutter wheel tip made of a hard metal alloy or diamond. However, this cutter wheel tip should never limit the scribing cutter. The scribing cutter to be mounted on the scribing head includes any cutters for forming a scribe line on a brittle substrate, such as a diamond point cutter, a round blade cutter in which both sides of its blade ridge is processed in the shape of a cone or a truncated cone, to name a few.

The next description and relevant drawings concern an embodiment of a scribing head according to claims 7 to 9 and an embodiment of a scribing method according to claims 13 to 16. Since the scribing method of this invention is realized in association with the scribing head, the embodiment of the scribing head is described in combination with the embodiment of the scribing method.

<Embodiment 2>

Figure 9:
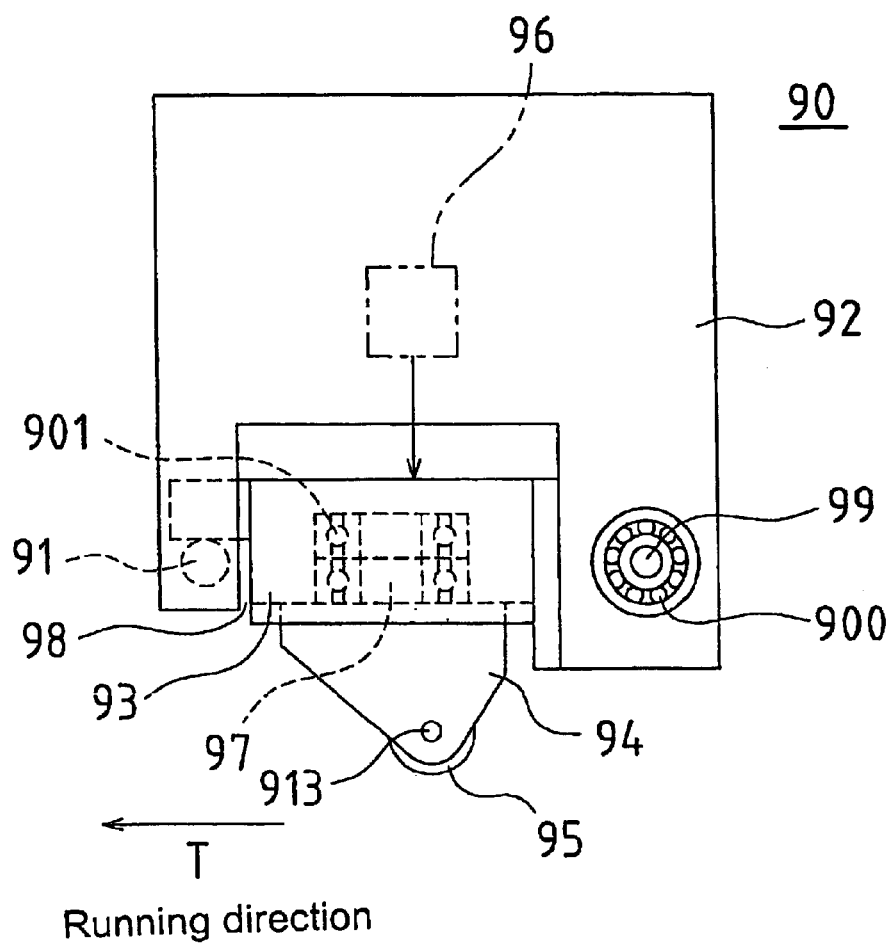
FIG. 9 is a front view of a scribing head according to Embodiment 2 of the invention.
Figure 10:
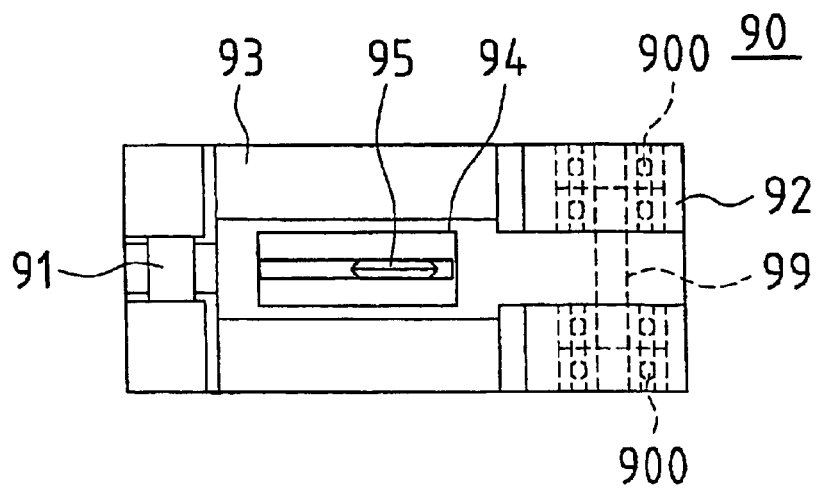
FIG. 10 is a bottom view thereof.

FIG. 9 is a front view of a scribing head according to Embodiment 2 of the invention. FIG. 10 is a bottom view thereof.

A scribing head 90 has a scribing head body 92, a bearing housing 93, a tip holder 94, a cutter wheel tip 95, and a bias means 96.

The bottom of the scribing head body 92 is cut away to form a notch 98 which accommodates the bearing housing 93. An end of the bearing housing 93 is joined, via a bearing 900, with a horizontal support shaft 99 which is inserted in the scribing head body 92. The other end abuts on a stopper shaft 91 which is contained within the scribing head body 92 and which extends parallel to the support shaft 99. Hence, the bearing housing 93 pivots around the axis of the support shaft 99 until it is stopped by the stopper shaft 91.

The tip holder 94 is mounted to the bearing housing 93 via a turning shaft 97 which extends orthogonally to the surface of the brittle substrate, the tip holder being freely swingable around the axis of the turning shaft 97. A bearing 901 is set between the turning shaft 97 and the bearing housing 93. The bias means 96 which locates above the turning shaft 97 is arranged to apply a biasing force to the cutter wheel tip 95, through the turning shaft 97 and the tip holder 94.

The tip holder 94 is not necessarily swingable about the axis of the turning shaft 97, but may be fixed to the bearing housing 93. In this case, members necessary for swinging movement (e.g. the bearing 901) can be omitted.

The cutter wheel tip 95 is attached to the tip holder 94 via a rotation shaft 913 which extends parallel to the surface of the brittle substrate, and can rotate freely around the axis of the rotation shaft 913. Besides, the rotation shaft 913 is offset from the axis of the turning shaft 97 toward the support shaft 99. However, the positional relationship between the cutter wheel tip 95 and the turning shaft 97 is not limited to this one. For example, the rotation shaft 913 of the cutter wheel tip 95 may locate right below the axis of the turning shaft 97.

For the scribing operation using this scribing head 90, the scribing head 90 is set to run on a brittle substrate, with the support shaft 99 being behind the cutter wheel tip 95. Namely, the scribing head 90 runs in the direction of Arrow T in FIG. 9. While the scribing head runs (in the direction of Arrow T in FIG. 13) with the support shaft 99 behind and with the cutter wheel tip 95 being pressed against a surface of the glass GL by the bias means 96, the point of contact between a blade ridge 95A of the cutter wheel tip 95 and the surface of the glass GL is given as the point E in FIG. 13. At this point E, a reaction force X is generated against a resultant force of a horizontal scribing force component V and a vertical scribing force component W, wherein the scribing force components V and W represent a horizontal component and a vertical component, respectively, of a scribing force which is required to scribe the glass GL by the cutter wheel tip 95. The reaction force X, which is directed to the support shaft 99, does not act as a turning moment which causes the cutter wheel tip 95 to jump up from the glass GL. In this situation, the tip holder does not bounce in the manner mentioned above, and the pressure to the cutter wheel tip 95 is not cancelled by the reaction force X. Consequently, the pressure applied to the cutter wheel tip 95 acts efficiently on the brittle substrate, realizing a vertical crack which is much deeper than the one obtained conventionally.

Figure 13:
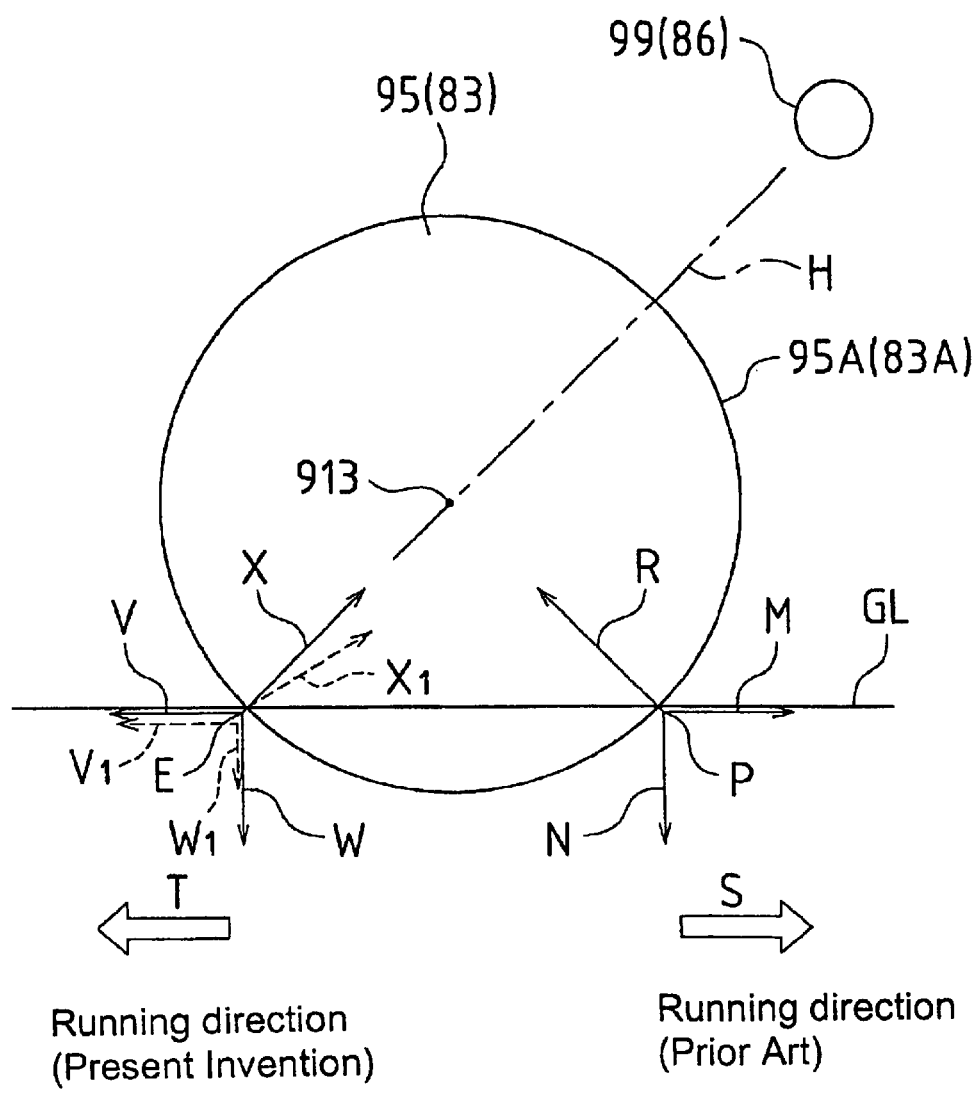
FIG. 13 is a schematic illustration for explaining a turning moment generated at the cutter wheel tip.
Figure 14:
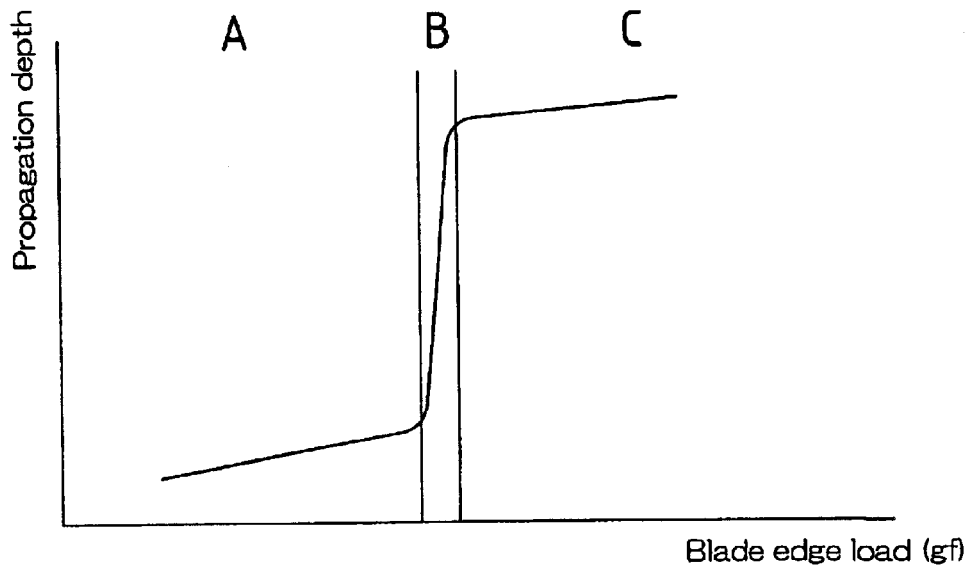
FIG. 14 is a graph which represents a relationship between the blade edge load and the vertical crack, in the case of a conventional scribing method.
Figure 15:
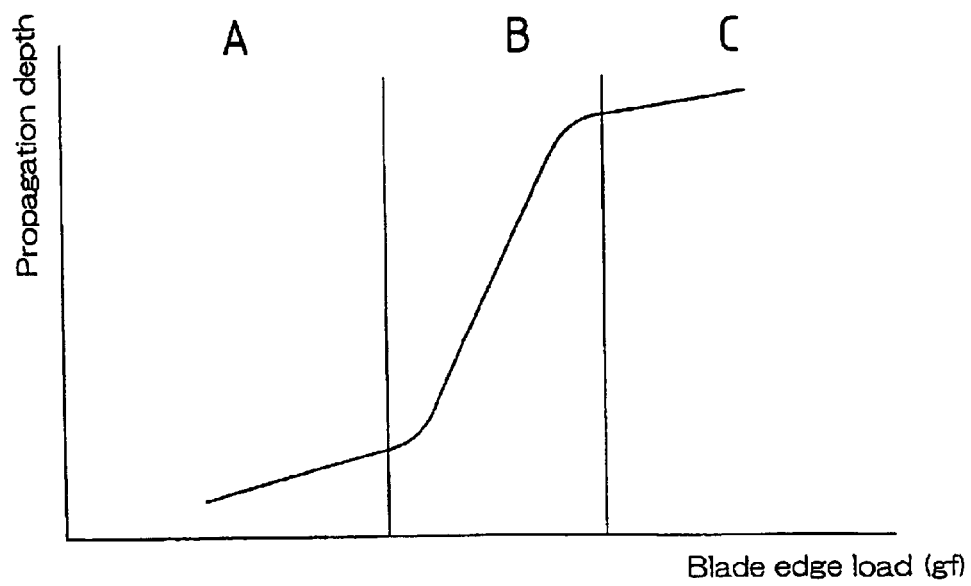
FIG. 15 is a graph which represents a relationship between the blade edge load and the vertical crack, in the case of the present invention.
Figure 16:
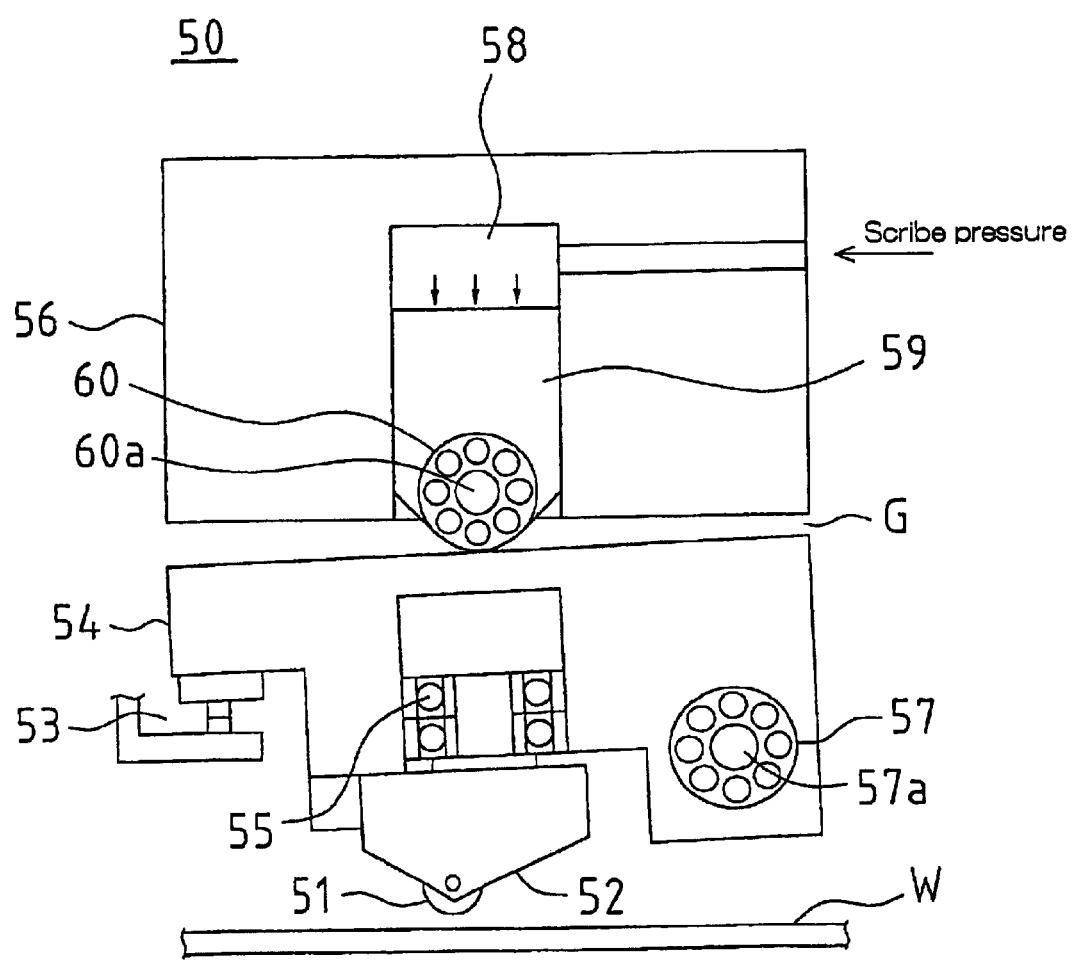
FIG. 16 is a sectional view of a conventional scribing head.
Figure 17:
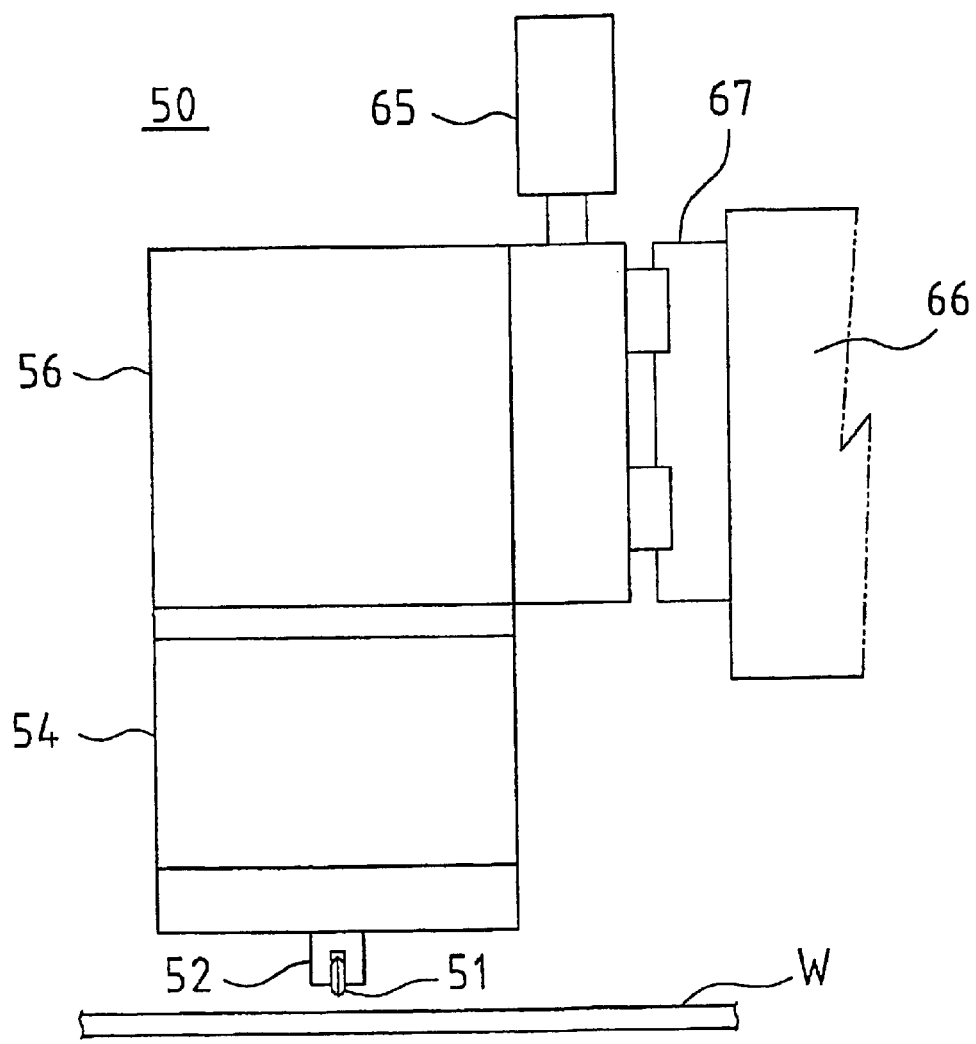
FIG. 17 is a side view thereof.
Figure 18:
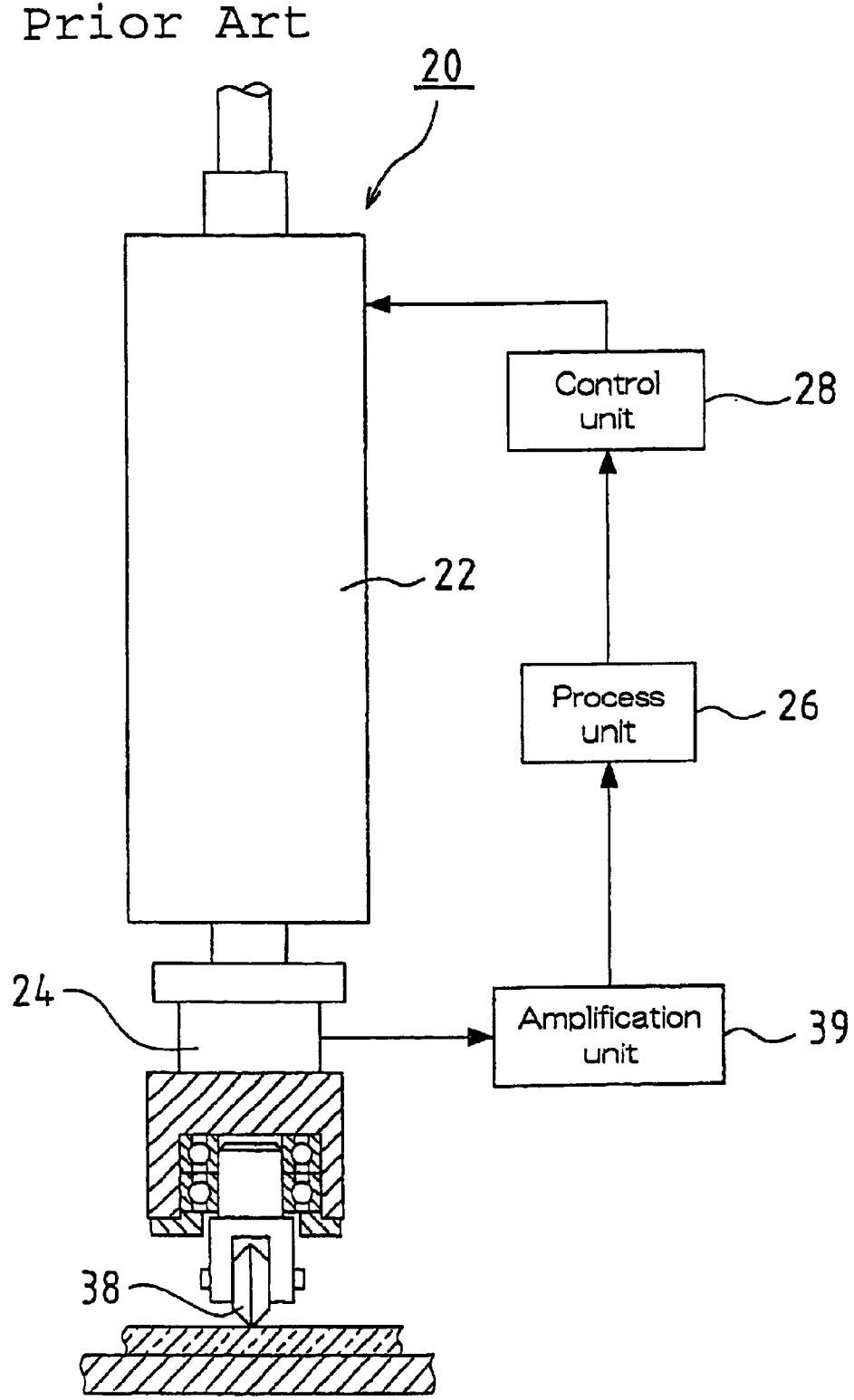
FIG. 18 is a configuration diagram for another conventional scribing head.
Figure 19:
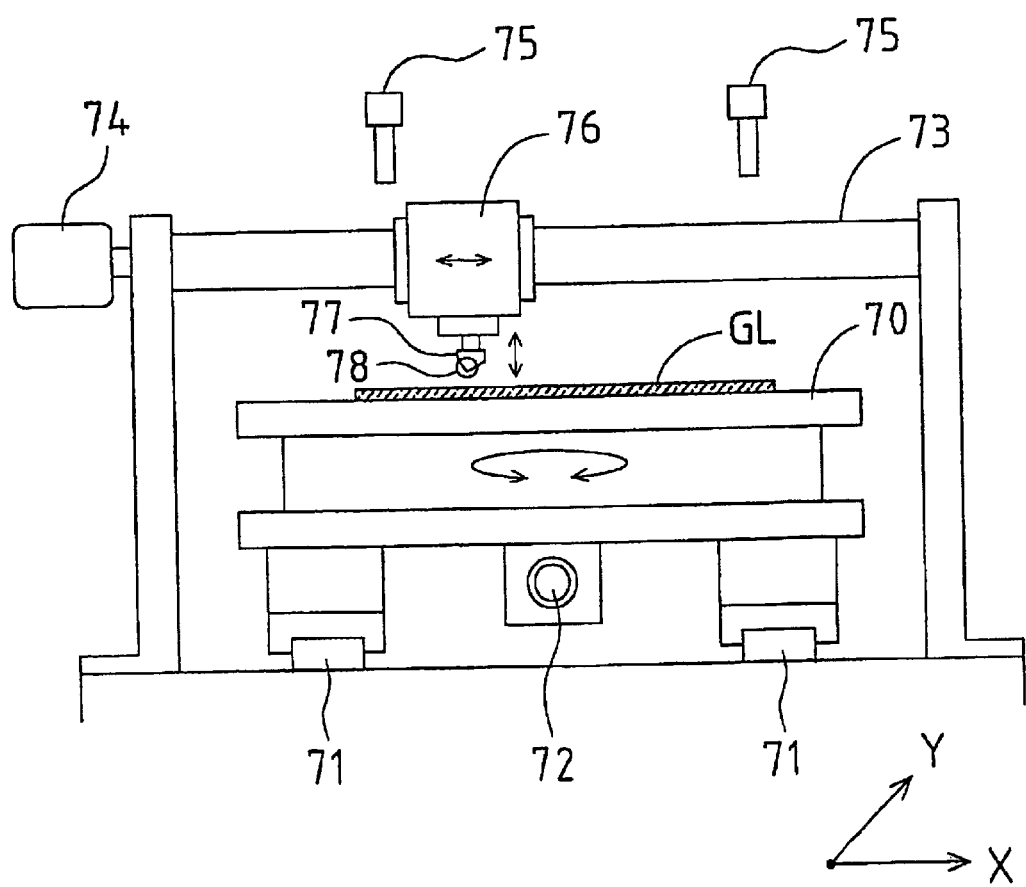
FIG. 19 is a schematic front view of a conventional scribing apparatus.
Figure 20:
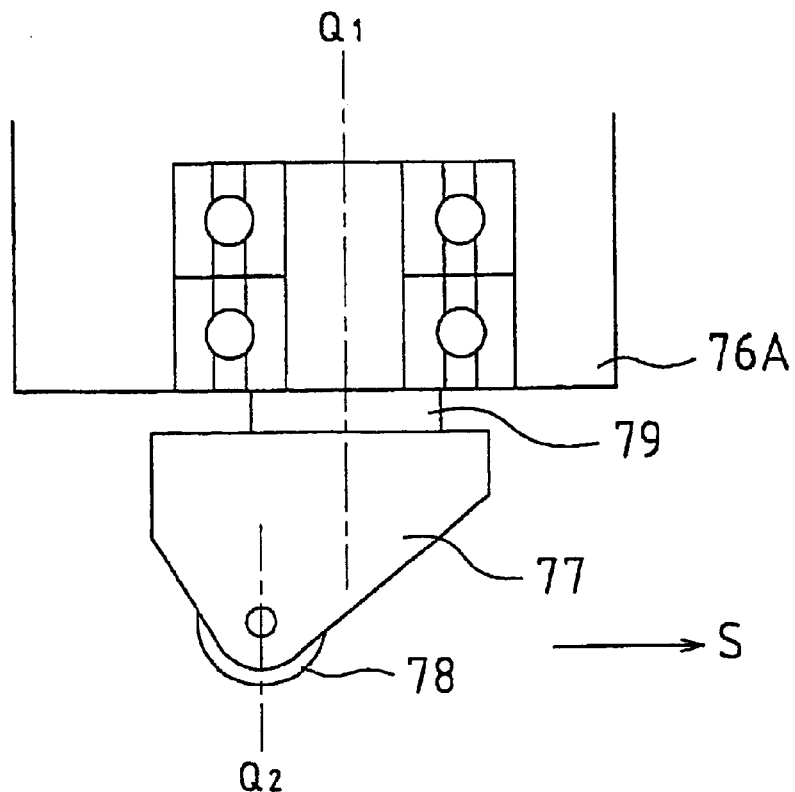
FIG. 20 is a schematic view of yet another conventional scribing head.
Figure 21:
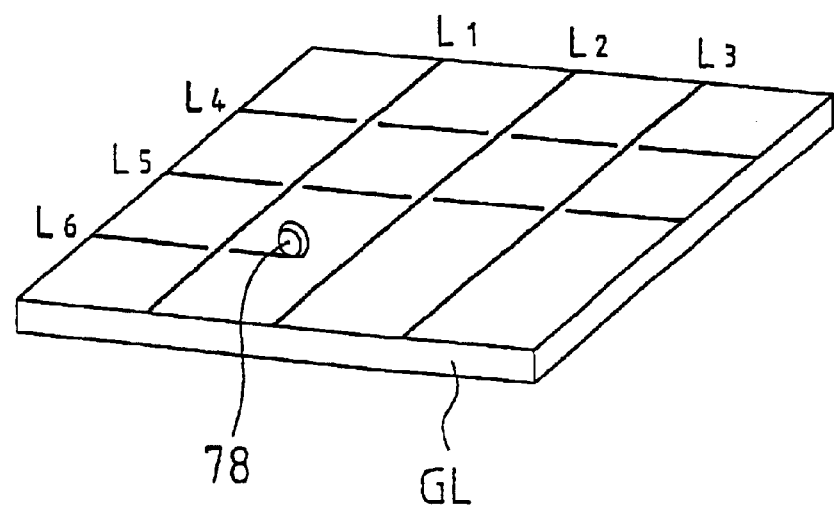
FIG. 21 is an illustrative description of a phenomenon of skipping intersections.
Figure 22:
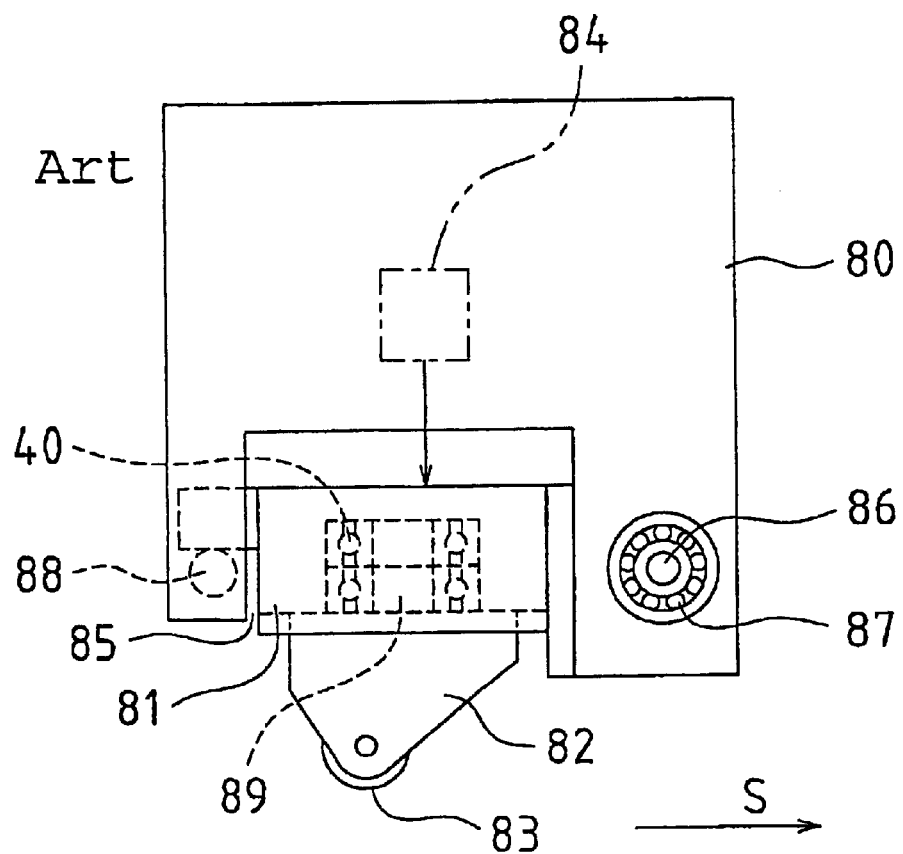
FIG. 22 is a front view of still another conventional scribing head.
Figure 23:
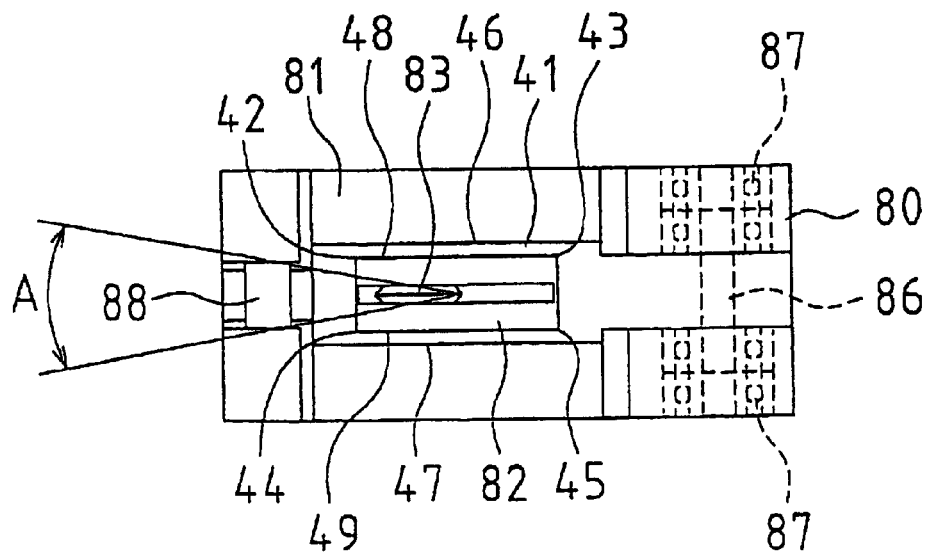
FIG. 23 is a bottom view thereof.

In this regard, FIG. 13 depicts orientations of the reaction force X which derives from the brittle substrate GL and which is exerted on the cutter wheel tip 95 during the scribing operation. Namely, the reaction force X is oriented along a line H which connects the origin E of the reaction force X and the axis of the support shaft 99, or oriented nearer to the brittle substrate GL relative to the line H (see dashed arrows $X_1$, $W_1$, $V_1$ in FIG. 13). With this arrangement, generation of the turning moment which causes a bounce of the tip holder can be avoided with a greater reliability. This state can be maintained by appropriate adjustment of the scribe speed, the pressure to the cutter wheel tip 95, and the relative positions of the cutter wheel tip 95 and the support shaft 99.

<Embodiment 3>

Figure 11:
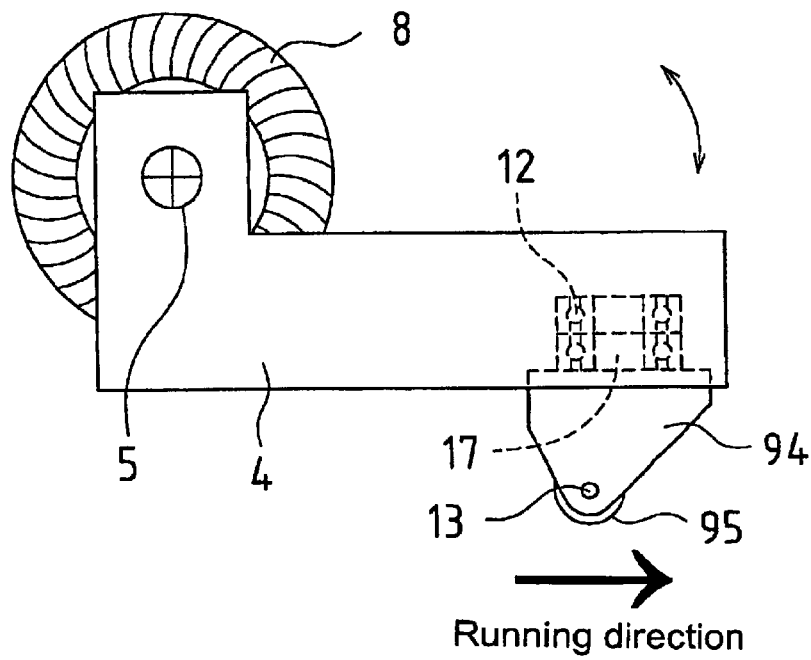
FIG. 11 is a front view showing a principal part of a scribing head according to Embodiment 3 of the invention.

Turning next to FIG. 11, the description moves to Embodiment 3 of the invention.

FIG. 11 is a front view showing a principal part of the scribing head. Its side view is similar to FIG. 1 and is therefore omitted.

In this scribing head 1, a servomotor 3 is held inverted between a pair of side walls 2. A holder carrier 4 with an L-shape profile is attached to the lower parts of the side walls 2 via a support shaft 5, and is capable of turning freely. A tip holder 94 for rotatably holding a cutter wheel tip 95 is mounted at the front part (in the right in FIG. 11) of the holder carrier 4.

The tip holder 94 is mounted to the holder carrier 4, via a turning shaft 17 provided at its top end and a bearing 12 in which the turning shaft 17 extends. The tip holder 7 can turn about the axis of the turning shaft 17.

Similar to Embodiment 2, the cutter wheel tip 95 is attached to the tip holder 94 via a rotation shaft 13 which extends parallel to the surface of the brittle substrate, and the cutter wheel tip can rotate freely around the axis of the rotation shaft 13. The rotation shaft 13 is offset from the axis of the turning shaft 17 for the tip holder 94, toward the support shaft 5.

The rotation shaft of the servomotor 3 and the support shaft 5 are equipped with bevel gears 8 which are in mesh with each other. In response to forward and reverse rotation of the servomotor 3, the holder carrier 4 pivots up and down about the support shaft 5, thereby raising and lowering the cutter wheel tip 95. Incidentally, the scribing head as a whole is movable along the horizontal guide rail 67 of the scribing apparatus 66 (see FIG. 1). It should be noted that the power transmission mechanism is not limited to bevel gears B.

Figure 12:
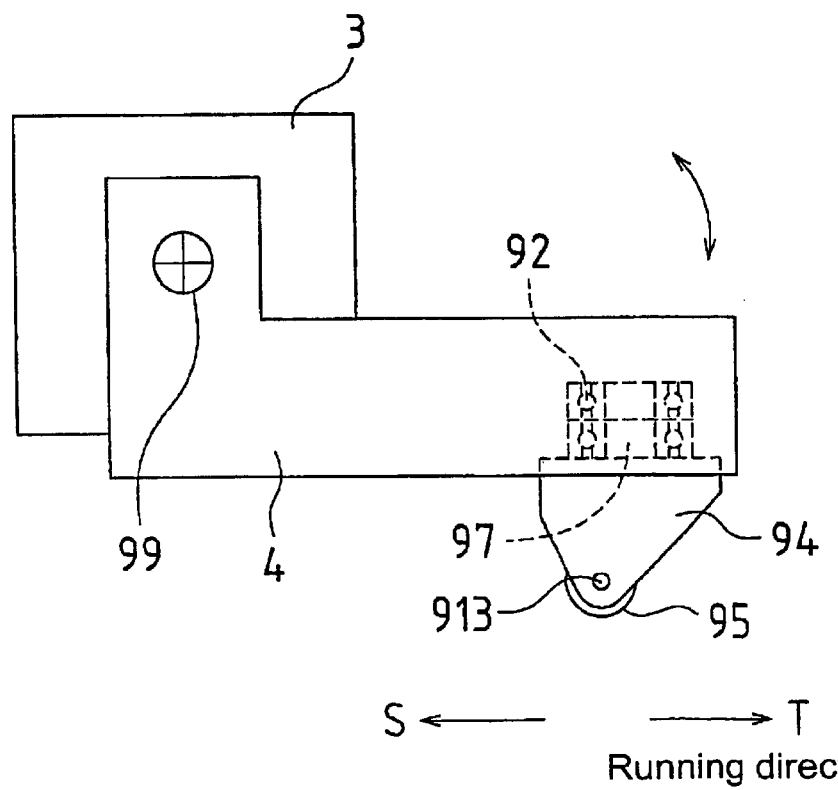
FIG. 12 is a front view of a different embodiment of the scribing head attached to the scribing apparatus shown in FIG. 11.

As the power transmission mechanism, this embodiment employs the bevel gears 8 in order to transmit power to the holder carrier 4. Alternatively, as shown in FIG. 12, the rotation shaft of the servomotor 3 may be directly joined with the holder carrier 4.

FIG. 13 depicts orientations of the reaction force X which derives from the brittle substrate GL and which is exerted on the cutter wheel tip 95 during the scribing action. Namely, the reaction force X is oriented along a line H which connects the origin E of the reaction force X and the axis of the support shaft 99, or oriented nearer to the brittle substrate GL relative to the line H (see dashed arrows $X_1$, $W_1$, $V_1$ in FIG. 13). With this arrangement, generation of the turning moment which causes a bounce of the cutter wheel tip 95 can be avoided with a greater reliability. This state can be maintained by appropriate adjustment of the scribe speed, the pressure to the cutter wheel tip 95, and the relative positions of the cutter wheel tip 95 and the support shaft 99.

In the next description, glass was scribed according to the scribing method of the invention and a conventional scribing method, and depths of vertical cracks formed on the glass were measured.

EXAMPLE

The scribing method of this invention was performed with the scribing head illustrated in FIG. 12, under the following conditions.

Wheel diameter of the cutter wheel tip: 2.5 mm

Wheel thickness of the cutter wheel tip: 0.65 mm

Blade edge angle of the cutter wheel tip: 125°

Scribe speed: 300 mm/sec
Blade edge load: 1.1 kgf
Glass composition: soda glass
Glass thickness: 0.7 mm
Scribing head running direction:
  Arrow T in FIG. 12

Comparative Example

For comparison, the scribing head was made to run in the direction of Arrow S in FIG. 12 as conventionally practiced. Otherwise, the scribing method was performed under the same conditions as EXAMPLE of the invention mentioned above. Incidentally, the orientation of the tip holder 94 was reversed in order that the rotation shaft 913 of the cutter wheel tip 95 was located behind the turning shaft 97 while the scribe head was running.

(Measurement Result)

After the respective scribing operations, depths of vertical cracks obtained by these methods were measured. The result was as follows:

| | |
|---|---|
| EXAMPLE | 450 μm–500 μm |
| COMPARATIVE EXAMPLE | 110 μm–120 μm |

As apparent from this result, the scribing method and the scribing head of the invention gave vertical cracks which were about four times deeper than those obtained conventionally, when the blade edge load was the same.

Industrial Applicability

Use of a servomotor simplifies the scribing head mechanism and realizes a scribing head and a scribing apparatus which are available at a lower price. Besides, the zero position can be detected on software, without relying on a conventional contact mechanism. Further, owing to good responsivity of the scribe pressure generation mechanism, various scribe conditions can be flexibly adopted.

Besides, there is no bounce of the tip holder, let alone skipping of intersections in the cross-scribing operation. Hence, the pressure to the cutter wheel tip is efficiently applied to the brittle substrate, realizing vertical cracks which are much deeper than those obtained conventionally. Therefore, in the breaking operation which follows the cross-scribing operation, the glass plate can be broken precisely along the scribe lines. Consequently, it is possible to eliminate occurrence of defective products and to enhance the productivity dramatically in comparison with the conventional technology.

What is claimed is:

1. A scribing head equipped with a scribing cutter for forming a scribe line on a brittle substrate, the scribing cutter being positioned by a servomotor which is driven under position-control mode so as to raise and lower the scribing cutter, wherein
when the scribing cutter deviates from a position set by the servomotor, the driving torque is limited while it acts to reposition the scribing cutter to the position set by the servomotor, and a driving torque is transmitted to the scribing cutter as a scribe pressure.

2. A scribing head according to claim 1, wherein transfer movement of the servomotor is converted to vertical movement through a gear, and the driving torque is applied as a scribe pressure.

3. A scribing head according to claim 1, wherein a scribe line is formed across another scribe line which is formed earlier, with the scribe pressure being raised temporarily when the scribing head passes the scribe line which is formed earlier.

4. A scribing head according to claim 1, wherein the driving torque of the servomotor is controlled at any of present limits while the position of the cutter of the scribing head shifts on the brittle substrate.

5. A scribing head according to claim 1, wherein the servomotor sets the position of the scribing head so as to locate below a top surface of the brittle substrate, and substantially at the same time as the start of a scribing action, the thus set position is lowered further to a predetermined position.

6. A scribing head according to claim 1, comprising:
   a scribing head body which runs on a brittle substrate;
   a tip holder mounted on the scribing head body via a support shaft which extends parallel to a surface of the brittle substrate, the tip holder being freely swingable around the axis of the support shaft; and
   a cutter wheel tip attached to the tip holder via a rotation shaft which extends parallel to the surface of the brittle substrate, the cutter wheel tip being freely rotatable around the axis of the rotation shaft.

7. A scribing head according to claim 6, wherein the tip holder is mounted via a turning shaft which extends orthogonally to the surface of the brittle substrate, the tip holder being freely swingable around the axis of the turning shaft.

8. A scribing head according to claim 7, wherein the rotation shaft is offset from the axis of the turning shaft toward the support shaft.

9. A scribing head according to claim 6, wherein the axis of the support shaft locates on or above a vector line of a reaction force which derives from the brittle substrate and which is exerted on the cutter wheel tip during the scribing action.

10. A scribing apparatus for scribing a brittle substrate by moving a scribing head which is equipped with a scribing cutter for forming a scribe line on the brittle substrate,
   wherein the scribing apparatus is equipped with a scribing head according to any one of claims 1 to 4, 5, 6 or 9.

11. A method for scribing a brittle substrate, using a scribing head which comprises: a scribing head body according to any one of claims 1 to 4, 5 or 6 to 9, which runs on the brittle substrate; a tip holder mounted on the scribing head body via a support shaft which extends parallel to a surface of the brittle substrate, the tip holder being freely swingable around the axis of the support shaft; and a cutter wheel tip attached to the tip holder via a rotation shaft which extends parallel to the surface of the brittle substrate, the cutter wheel tip being freely rotatable around the axis of the rotation shaft,
   wherein the scribing head forms a scribe line on the surface of the brittle substrate by running on the brittle substrate, with the support shaft locating behind the cutter wheel tip.

12. A method for scribing a brittle substrate according to claim 11, wherein the tip holder is mounted via a turning shaft which extends orthogonally to the surface of the brittle substrate, the tip holder being freely swingable around the axis of the turning shaft.

13. A method for scribing a brittle substrate according to claim 12, wherein the rotation shaft is offset from the axis of the rotation shaft toward the support shaft.

14. A method for scribing a brittle substrate according to claim 11, wherein a reaction force which derives from the brittle substrate and which is exerted on the cutter wheel tip during the scribing action, is oriented along a line which connects the origin of the reaction force and the axis of the support shaft, or oriented nearer to the brittle substrate relative to the line.

15. A scribing head according to any one of claims 1 to 4, 5, or 6 to 9 wherein the scribing head raised and lowers in a direction perpendicular to a major surface of the brittle substrate.

16. A method for scribing a brittle substrate, equipped with a scribing cutter for forming a scribe line on the brittle substrate, the scribing cutter being positioned by a servo-motor which is driven under position-control mode so as to raise and lower the scribing cutter, the brittle substrate being scribed with a driving torque of the servomotor which is transmitted to the scribing cutter as a scribe pressure, wherein when the scribing cutter deviates from a position set by the servomotor, the driving torque is limited while it acts to reposition the scribing cutter to the position set by the servomotor.

17. A method for scribing a brittle substrate according to claim 16, wherein transfer movement of the servomotor is converted to vertical movement through a gear, and the driving torque is applied as a scribe pressure.

18. A method for scribing a brittle substrate according to claim 16, wherein a scribe line is formed across another scribe line which is formed earlier, with the scribe pressure being raised temporarily when the scribing head passes the scribe line which is formed earlier.

19. A method for scribing a brittle substrate according to claim 16, wherein the driving torque of the servomotor is controlled at any of preset limits while the position of the scribing cutter of the scribing head shifts on the brittle substrate.

20. A method for scribing a brittle substrate according to claim 16, wherein the servomotor sets the position of the scribing head so as to locate below a top surface of the brittle substrate, and substantially at the same time as the start of a scribing action, the thus set position is lowered further to a predetermined position.

21. A method for scribing brittle substrate according to any one of claims 16 to 20, wherein transfer movement of the servomotor is converted to vertical movement through a gear, and the driving torque is applied as a scribe pressure.

* * * * *